Sept. 23, 1958 G. C. SZIKLAI 2,853,546

PHASE CONTROLLED OSCILLATORS

Filed June 16, 1953

INVENTOR.
GEORGE C. SZIKLAI

BY

ATTORNEY 2,853,546
Patented Sept. 23, 1958

2,853,546

PHASE CONTROLLED OSCILLATORS

George C. Sziklai, Princeton, N. J., assignor to Radio Corporation of America, a corporation of Delaware Application June 16, 1953, Serial No. 361,894
14 Claims. (Cl. 178—5.4)

This invention relates generally to controlled oscillator circuits, and particularly to oscillator circuits capable of providing synchronous operation with a reference wave in television receivers and the like.

In the type of color television system which presently is in accordance with the standards proposed by the National Television Systems Committee (NTSC) the side bands of a subcarrier wave, which is both phase and amplitude modulated in accordance with the color information of a subject, are interspersed with the video signals representing brightness of the subject. By properly choosing the frequency of the color subcarrier wave, the color signal modulated side band energy components may be made to fall between the brightness signal energy components.

In such systems the color information is derived at a receiver by synchronously demodulating the color subcarrier wave. Such demodulation is effected under the control of a reference frequency oscillator operating in synchronism and in definite phase relation with the received phase and amplitude modulated color subcarrier wave.

For the synchronization of the receiver color subcarrier wave reference frequency oscillator it is the present practice to transmit a composite signal which includes in addition to the video signals comprising the brightness and color information the usual horizontal and vertical synchronizing signals and also bursts of several cycles each of the color subcarrier wave frequency respectively following the horizontal synchronizing signals. Such a color synchronizing system is described in a publication titled, "Recent Developments in Color Synchronization in the RCA Color Television System," issued by the Radio Corporation of America, February 1950. Such a system is also described in U. S. Patent 2,594,380 issued April 29, 1952, to L. E. Barton and P. H. Werenfels entitled "Synchronizing Apparatus for Color Signal Sampling Oscillators." The general burst type of color synchronizing system also forms the subject of U. S. Patent 2,728,812 issued Dec. 27, 1955 to A. V. Bedford, entitled "Synchronizing Apparatus."

The demodulation of the color subcarrier wave and its side bands, as previously mentioned, is performed along definite axes or phases. Since the accuracy of these phases will determine the accuracy of the hue of the color information ultimately applied to the kinescope, there must be information transmitted with the composite signal which establishes a reference phase. This color synchronizing information referred to as the burst must be extracted from the composite signal and used to establish a pair of continuous wave signals of phase corresponding to the I and Q axes. These continuous wave signals are used in a pair of synchronous detector circuits whose outputs are the I and Q signals in the present type of color television receiver. These continuous wave signals may be obtained in a number of different ways. One method is to use a crystal oscillator whose exact frequency is determined by a reactance tube which is in turn controlled by an error signal proportional to the difference in phase between the incoming synchronization information and the oscillator output.

An object of the present invention, therefore, is to provide an improved automatic frequency control system for color television receivers to effect simpler and more efficient synchronization of a color subcarrier reference frequency oscillator in response to received bursts of the color subcarrier wave.

Another object of the present invention is to provide an improved oscillator circuit which may effectively be locked in from information received in the form of a discrete burst of information and which effectively remains locked in until receipt of the next burst of information.

A further object of the present invention is to provide an improved reference frequency oscillator which is insensitive to amplitude variation which, therefore, requires no separate limiting action.

Still another object of the present invention is to provide an automatic frequency control system for television receivers and the like which may operate with a single semi-conductor device as an oscillator, a phase detector and a reactance device simultaneously.

In accordance with one aspect of the present invention, a semi-conductor device of the point contact type is utilized as a reference frequency oscillator. Bursts of the color subcarrier wave, which have been separated from the composite video signal by gating at a time when the burst information is available, are impressed upon the collector electrode circuit thereby developing in the base electrode circuit a biasing voltage which is proportional to the sense and phase difference between the bursts of the color subcarrier wave and the operating frequency of the oscillator circuit. Accordingly a corrective voltage is developed in the base electrode circuit thereby adjusting the phase of the reference frequency oscillator circuit in accordance with the information contained in the bursts.

In accordance with another aspect of the present invention a semi-conductor device of the junction type is utilized in a reference frequency oscillator circuit somewhat analogous to a Hartley oscillator. Bursts of the color subcarrier wave are applied to the emitter electrode circuit to thereby compare the frequency and phase of the burst information with the frequency and phase of the wave generated by the reference frequency oscillator circuit. Accordingly the phase and frequency of the reference frequency oscillator are corrected to correspond to that of the burst information.

In accordance with another feature of the present invention an electron discharge device is utilized as a reference frequency oscillator circuit in the form of a Hartley oscillator. Bursts of the color subcarrier wave which have been separated from a composite video signal are applied to the cathode circuit of the reference frequency oscillator thereby developing a corrective bias affecting a correction of the phase and frequency of the reference frequency oscillator circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3, 4:
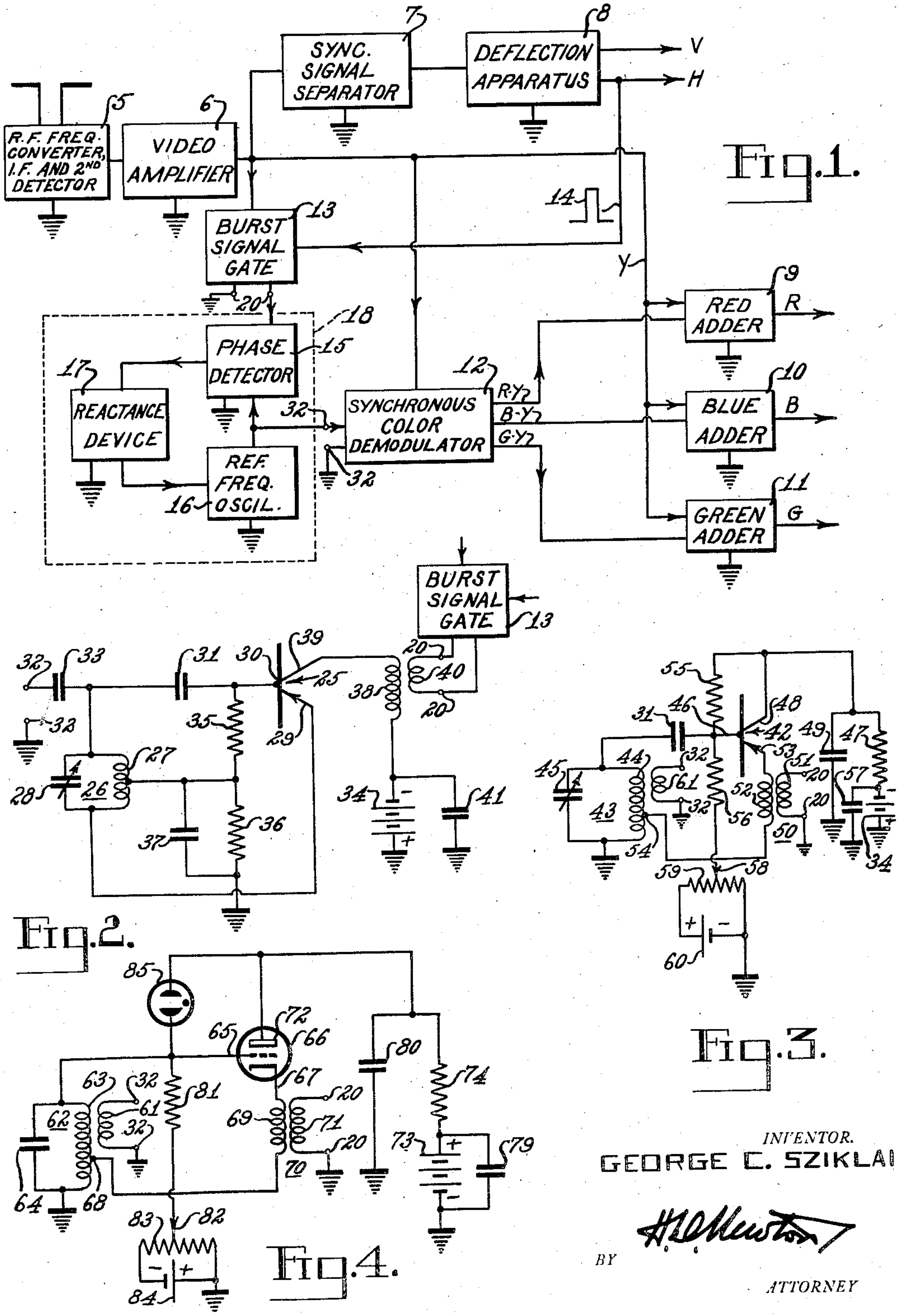
Figure 1 is a system diagram in block form, of those portions of a color television receiver which relate to the color information of the received signal and illustrate the operation of the invention in connection therewith.
Figure 2 is a schematic circuit diagram of a controlled oscillator circuit, which is adapted for use in the system of Figure 1, in accordance with the present invention.
Figure 3 is a schematic circuit diagram of a semiconductor phase controlled oscillator circuit illustrating a further embodiment of the present invention.
Figure 4 is a schematic circuit diagram of a phase controlled oscillator circuit utilizing an electron discharge device further in accordance with the present invention.

In television systems of a type in which this invention may be incorporated video information is transmitted during recurring intervals and scanning control signals as well as blanking signals are transmitted in between these intervals. A horizontal sync pulse is superimposed upon a blanking pulse and that portion of the blanking pulse following the superimposed horizontal sync pulse is generally termed the "back porch." This term will be used for the sake of brevity and convenience. In accordance with the present NTSC standards a sampling control signal of a properly selected frequency is transmitted during this back porch interval. That is to say it follows a sync signal but occurs during blanking. At the receiver the sampling control signal occurring during the back porch interval is used to control the phase and frequency of the reference frequency oscillator. In this way, extremely stable synchronization can be obtained between the sampling at the receiver and the sampling at the transmitter in such manner as to not interfere with the normal operation of the television receiver.

In Figure 1 a conventional television tuner 5 is provided for receiving and demodulating a transmitted television carrier wave. It may comprise as the legend indicates a carrier wave or radio frequency amplifier circuit, a frequency converter circuit and a second detector circuit whereby the composite television signal including a video signal comprising both brightness information and color information of a subject in the form of a phase and amplitude modulated subcarrier wave having a nominal frequency equal substantially to one of the higher brightness component frequencies, is recovered from the carrier wave. The composite signal also will be understood to include the usual horizontal and vertical signals for maintaining synchronous operation of the receiver deflection apparatus with that of the transmitter. In addition, the composite signal will also be understood to include a burst of several cycles of the color subcarrier wave frequency superimposed substantially on the back porch of the horizontal synchronizing signals. The composite signal which has been derived from the television carrier wave by the circuits in the television tuner 5 is coupled in the usual manner to a conventional video amplifier 6 which is provided for further amplification of the composite signal.

The information necessary for the coordinated operation of the various circuits of the television receiving system is derived from the output of the video amplifier 6 by means of frequency selective circuits. Accordingly the synchronization signals which are necessary for the proper synchronization or timing of the deflection apparatus are coupled from the output of the video amplifier 6 to the input of the sync signal separation apparatus 7 which is in turn coupled to the deflection apparatus 8 for proper placement of the electron beam on the face of the kinescope in synchronism with the scanning of the subject at the transmitting equipment. Luminance information is passed from the composite signal output of the video amplifier 5 and applied to the color matrix comprising the red adder 9, the blue adder 10 and the green adder 11 each represented in block diagram for the sake of simplicity.

Chrominance information is derived from the composite signal by means of two or three synchronous color demodulators illustrated as a single block 12 containing the legend "Synchronous Color Demodulators." For simplicity sake this has been shown as a single block. However, in practice this block is known to contain a pair of synchronous demodulators. The synchronous demodulators are utilized to compare the information received from the composite signal with information received from a reference frequency oscillator which will be discussed more fully hereinafter.

Color synchronization to which this invention appertains is derived by means of a burst signal gate 13 which as illustrated, is gated by the application of a horizontal deflection pulse illustrated as a wave form 14 which is delayed and applied from the output of the deflection apparatus 8 to the burst signal gate 13. Accordingly the burst signal gate 13 is triggered by the horizontal deflection pulse 14 so as to allow the passage of information from the output of the video amplifier 5 to the phase detector 15 at the instant when the burst information is available in the composite signal.

In accordance with the teachings of the above identified references concerning color synchronization, a reference frequency oscillator is normally provided which is designed to operate at the frequency of the color subcarrier wave. The output of this oscillator, however, must be precisely controlled to be in phase or cophasal with the information contained in the burst. Accordingly a portion of the output energy of the reference frequency oscillator 16 is applied also to the phase detector 15 wherein the information contained in the burst is compared with the output of the reference frequency oscillator and a corrective voltage applied to a reactance device 17. As is usual with conventional oscillator circuits, the reactance device is adapted to vary the frequency of the reference frequency oscillator to correct for any phase difference that might exist between the information contained in the burst and the output of the reference frequency oscillator 21.

The output of the reference frequency oscillator 16 is also applied to the synchronous color demodulators 12 to determine the axes or phases along which demodulation occurs. Since the accuracy of these phases will determine the accuracy of the hue of the color information ultimately applied to the kinescope, it is readily understood that precise control of the reference frequency oscillator is neecssary.

The phase detector 15, the reactance device 17 and the reference frequency oscillator 16 form what is normally considered a part of the color synchronization channel in a color television receiver and is called the color hold circuit, which in Figure 1 has been included within the dotted rectangle 18. It is believed to be readily apparent that when using conventional circuits, the three separate functions of phase detection, oscillation generation and frequency control of the oscillator must be performed simultaneously by three separate stages utilizing three separate vacuum tubes or other amplifying devices.

In accordance with the present invention, however, these three functions are performed by a single circuit such as, for example, as illustrated in Figure 2 of the drawing. This circuit may replace the oscillator system enclosed in the dotted rectangle 18 of Figure 1 and includes a point contact transistor 25, which has been adapted for sustained sine wave oscillation. Accordingly a tank circuit 26 comprising an inductor 27 and a variable capacitor 28 is connected between the emitter electrode 29 and the base electrode 30 through a coupling capacitor 31. A pair of output terminals 32 are provided for connection with means, such as the color demodulators 12, for utilizing the energy generated by the oscillator circuit. One of these output terminals 32 is connected to the junction of the tuned tank circuit 26 and the capacitor 31 through a coupling capacitor 33. The other terminal of the output terminals 32 may be connected to a point of fixed reference potential such as chassis ground. These terminals also appear in Figure 1 as the terminals between the color hold circuit 18 and the synchronous demodulators 12.

In accordance with the present invention, a pair of resistors 35 and 36 are connected in series arrangement between the base electrode 30 and ground to provide a means for automatically controlling the bias applied to the transistor 25. In order to complete the bias circuit, a center tap on the inductor 27 is connected directly to the junction of the two resistors 35 and 36. A capacitor 37 is connected in shunt with the resistor 36 for developing and storing energy to be utilized as a direct current bias in response to the current flowing through the resistor 36 as will be more fully hereinafter described. It has been found that the time constant determined by the capacitor 37 and the shunt connected resistor 36 should be in the order of 60 microseconds in order to maintain the circuit in a locked in condition between bursts. This time, of course, is determined by the time spacing of the burst information and should normally correspond at least to the time interval between bursts.

In order to apply a reference wave, such as the gated burst above discussed, to the oscillator for comparison purposes, an inductor 38 is connected between the negative terminal of a source of direct current supply illustrated as a battery 34, and the collector electrode 39 of the transistor 25. The battery may be bypassed at signal frequency by a shunt connected capacitor 41. Accordingly information such as the burst signal from the burst signal gate 13 as illustrated in Figures 1 and 2 may be inductively coupled as shown in Figure 2 by means of the inductor 40 and the input terminals 20 which are illustrated in Figure 1 between the burst signal gate 13 and the color hold circuit 18.

It is well known by those skilled in the semi-conductor art that a point contact transistor having an N type body as is illustrated in Figure 2 of the drawing will conduct only when the base electrode is negative with respect to the emitter electrode. If it is assumed that the transistor is of opposite conductivity type such as P type material, the polarities, of course, will have to be reversed. It is also well known to those skilled in the semi-conductor art that a point contact transistor as illustrated in Figure 2 can be made to operate as a sine wave oscillator by providing a parallel tuned circuit such as the parallel tuned circuit 26 in the base electrode lead due to the negative resistance of the base electrode circuit of the transistor. This aspect of semi-conductor devices is described in a U. S. patent to Eberhard No. 2,533,001, issued December 5, 1950 for Flip-Flop Counter Circuit. Accordingly if the collector electrode voltage is essentially 180 degrees out of phase with the voltage developed in the parallel resonant tank circuit 26 due to the oscillation of the circuit, current will flow through the diode formed by the collector electrode 39 and the base electrode 30 and through the series resistors 35 and 36 thereby charging the capacitor 37 so that the junction of the resistors 35 and 36 will become positive with respect to ground.

On the other hand, if the collector electrode voltage due to the impressed wave is negative when the voltage at the base electrode 30 is negative as will occur when the impressed wave is in phase with the oscillations developed in the parallel resonant tank circuit 26, the semi-conductor device 25 will conduct from the emitter electrode 29 to the collector electrode 39 thereby drawing current through the resistor 36 and charging the capacitor 37 so that the junction between the resistors 35 and 36 will become negative with respect to ground. If the impressed reference wave is 90 degrees out of phase with the voltage in the oscillator tank circuit 26, the voltage developed at the junction between the resistors 35 and 36 will be negative half of the time and positive the other half of the time thus averaging zero over the time determined by the time constant as determined by the resistor 36 and the shunt connected capacitor 37.

It is readily seen that the voltage developed across the capacitor 37 is applied between the base electrode 30 and ground. Accordingly, the bias current flowing in the base electrode circuit is determined by this voltage. It is well known that the reactance which represents a portion of the base electrode impedance of a semi-conductor device is proportional to the bias current. Accordingly the reactance of the base electrode circuit which is in parallel with the parallel resonant tank circuit 26 varies with the phase difference between the reference wave applied to the input inductor 40 and the voltage in the parallel resonant tank circuit 26, and the frequency of the oscillator circuit is adjusted in accordance with any such phase difference to be cophasal with the reference wave.

The controlled oscillator circuit illustrated in Figure 3 utilizes a semi-conductor device such as a P-N-P junction transistor 42 connected in a circuit somewhat analogous to a conventional Hartley oscillator circuit. Accordingly a parallel resonant tank circuit 43 comprising a tapped inductor 44 and a variable capacitor 45 is connected between ground and the base electrode 46 through a coupling capacitor 31. Operating bias for the oscillator circuit is provided by means of a source of direct current potential not shown and a resistor 47 connected between the negative terminal of the source of direct current bias voltage illustrated as a battery 34 and the collector electrode 48. The battery 34 may be bypassed at signal frequencies by a capacitor 57. A storage capacitor 49 selected to provide with the resistor 47 a time constant in the order of 60 microseconds or more, is connected in shunt with the resistor 47.

An input circuit for the reference frequency or burst information is provided by means of a transformer 50 comprising an input winding 51 and a secondary winding 52 which is connected between the emitter electrode 53 and the tap 54 on the inductor 44. The corrective bias which is developed in the collector electrode circuit due to changes in current flow in the collector electrode circuit with variation in phase between the generated wave of the oscillator circuit and the reference frequency wave is applied to the base electrode 46 by means of a feedback resistor 55 connected between the collector electrode 48 and base electrode 46. This feedback path can, of course, include additional storage elements.

Output energy from the oscillator circuit may be derived inductively by means of an inductor 61 as illustrated in Figure 3 or by means of a capacitive coupling arrangement as illustrated in Figure 2. Either of these output arrangements is applicable to the two modifications of the oscillator circuits illustrated.

In order to provide a coarse manual bias adjustment for the static bias voltage to be applied between the emitter electrode 53 and the base electrode 46, a resistor 56 is connected between the base electrode 46 and the variable tap 58 of a potentiometer 59. A battery 60 is connected across the potentiometer 59 to provide a source of direct current bias potential. The negative terminal of the battery 60 may be connected to chassis ground. Accordingly the bias applied may be adjusted so that proper operation of the oscillator circuit may be obtained.

As to the operation in the circuit illustrated in Figure 3 let it first be assumed that the oscillator is oscillating at a frequency determined by the parallel resonant tank circuit 43. If under these conditions a burst of energy of a frequency substantially equal to that of the frequency of oscillation is applied to the primary winding 51 of the input transformer 50, there will be developed in the collector electrode circuit a voltage which is representative of the phase difference between the voltage of the oscillator circuit and the voltage of the impressed reference wave. This is readily apparent in that the current which flows in the collector electrode circuit of a semiconductor device is dependent in part upon the voltage or bias that exists between the base electrode and the emitter electrode. It is believed to be readily apparent that the bias which will exist between the base electrode 46 and the emitter electrode 53 will depend on in part the phase relation between the voltage in the parallel resonant tank circuit and the voltage developed across the secondary winding 52 due to the input reference wave being applied across the primary winding 51 of the input transformer 50.

Upon a proper selection of the capacitor 49 and the collector electrode resistor 47 to provide an appropriate time constant, as above discussed, the voltage pulses which are representative of the phase difference between the two waves will be integrated and accordingly a corrective voltage will be applied to the base electrode 46 due to the feedback resistor 55 which is connected between the base electrode 46 and the collector 48. As above mentioned, the feedback resistor 55 may be divided into two separate resistors with the center bypassed to ground to provide additional filtering. Accordingly this corrective voltage will be in such a direction so as to alter the reactive characteristic of the semi-conductor device thereby effecting the resonant frequency of the oscillator circuit in such a direction to bring the generated wave into phase with the impressed reference carrier wave.

If the reference frequency wave is impressed upon the primary winding 51 in the form of discrete bursts as above described in connection with Figure 1, it is readily seen that the oscillator frequency is corrected to provide a cophasal relation between the burst information and the generated wave, and it has been found that such phase condition exists until the receipt of the next burst of information. In other words, once the oscillator frequency has been shifted in phase to correspond to the information contained in the burst signal, the oscillator will remain locked into this reference until another burst of information is received which may or may not require an altering of the phase relation between the bursts of information and the oscillator frequency.

The circuit illustrated in Figure 4 is essentially a Hartley oscillator adapted in accordance with the present invention to operate as a phase detector and a controlled oscillator circuit. Accordingly a parallel resonant tank circuit 62 including a tapped inductor 63 and a capacitor 64, which if desired, may be variable is connected between the control grid 65 of an electron discharge device 66 and a point of fixed reference potential such as ground. The cathode 67 of the electron discharge device 66 is connected to the tap 68 on the inductor 62 through the secondary winding 69 of an input transformer 70. Input signals, to provide a reference frequency wave such as the information obtained from the burst signal gate 13 in Figure 1, may be applied to the primary winding 71 of the input transformer 70.

Energizing voltage for the anode 72 of the electron discharge device 66 may be provided by means of a source of direct current voltage illustrated as a battery 73 having a positive terminal connected to the anode 72 through the anode load resistor 74. The battery 73 may be bypassed at signal frequencies by a capacitor 79.

As previously discussed in connection with Figure 4, a capacitor 80 is connected in shunt with the anode load resistor 74 and selected to provide, in combination with the load resistor 74, a time constant in the order of 60 microseconds or as determined by the time lapse between the bursts of received information.

In order to establish the bias voltage on the control grid 65 which is necessary for proper operation of the oscillator circuit, a bias resistor 81 is connected between the control grid 65 and a variable tap 82 on a potentiometer 83. The voltage for this circuit may be derived from a source of direct current potential such as a battery 84 which is connected in shunt with the potentiometer 83. The negative terminal of the battery 84 may be connected to chassis ground or other reference point.

An output circuit which may be provided as in Figures 2 and 3 is illustrated as an inductor 61 inductively coupled with the inductor 63 and provided with a pair of output terminals 32. The control voltage which is developed in the anode circuit due to the phase comparison of the generated wave and the applied reference frequency wave is fed back from the anode circuit to the grid circuit by means of a gas discharge device 85 such as a neon tube. It is well known in the art that a gas discharge device such as a neon tube provides essentially a constant direct current voltage drop. Accordingly any variation in the direct current potential existing at the anode 72 will be applied to the control grid 65.

As to the operation of the circuit illustrated in Figure 4, let it first be assumed that the oscillator is operating essentially at the frequency of the subcarrier color wave as described in connection with Figure 1. Let it also be assumed that bursts of subcarrier color information are applied through the primary winding 71 of the input transformer 70 from a source such as the burst signal gate 18 illustrated in Figure 1.

It is well known that the signal which is developed in the anode circuit of an electron discharge device is controlled by the voltage which exists between the control grid and the cathode of such device. It is readily apparent, therefore, that the voltage which will be applied between the control grid 65 and the cathode 67 will be determined by the phase relation between the generated wave in the tank circuit 62 and the impressed reference frequency wave existing across the secondary winding 69 of the input transformer 70.

If any phase difference exists between these two waves, a signal will be developed in the anode circuit corresponding to such phase difference. This signal will be applied as above mentioned to the control grid 65 through the gas discharge device 85.

The variation of the input capacitance of an electron discharge device with variations of the load applied to such device or with variations of applied bias voltages is well known as the Miller effect. It is this variation of the input capacitance with variations of applied bias voltages that is utilized by the present invention to effect an adjustment of the oscillator frequency or phase to conform to the frequency or phase of an impressed reference frequency wave.

Accordingly as above discussed, when corrective voltage is developed in the anode circuit due to a phase difference existing between the reference frequency and the generated wave, the input capacitance of the electron discharge device 66 is caused to vary in accordance with this detected phase difference. In view of the fact that the input capacitance of the electron discharge device 66 is in parallel with the parallel resonant tank circuit 62, the operating frequency and/or phase of the generated wave is adjusted to be cophasal with the impressed reference frequency wave.

It is, therefore, readily seen that the controlled oscillator circuits illustrated in Figures 2, 3 and 4 may provide the three separate functions that are required for color synchronization in a color television receiving system. That is, this single circuit requiring an amplifier device such as a semi-conductor device or an electron discharge device, depending on the embodiment of the invention selected, provides the function of a phase detector, a variable reactance device and a reference frequency oscillator as required for color synchronization. It has been found that these circuits locked in effectively in phase with the burst information and remain locked in until varied by an additional burst of information, and further the circuits are substantially insensitive to amplitude variations.

It is accordingly apparent that this circuit may also be used in place of a limiter in television receiving systems or frequency modulation receiving systems and further may be used as a muting device in synchronized transmission systems, or as a local carrier source in suppressed carrier transmission systems.

What is claimed is:

1. A signal responsive control network including a semi-conductor device having a base electrode, an emitter electrode, and a collector electrode and having a reactive impedance characteristic which is proportional to the current through said device, means connected with said electrodes for establishing an oscillatory circuit thereby to generate a wave at a predetermined frequency, signal input means for impressing a reference wave between two of said electrodes, phase detecting means including said device for developing a corrective voltage proportional to the phase difference between said waves, circuit means adapted to apply said corrective voltage to said base electrode to bring said generated wave in phase with said reference wave, and an output circuit for the generated and controlled wave coupled with said oscillatory circuit.

2. A signal responsive control network including a semi-conductor device of the current multiplication type having a base electrode, an emitter electrode and a collector electrode and having a reactive impedance characteristic which is proportional to the current through said device, oscillator circuit means connected with said electrodes and including a parallel resonant circuit connected to said base electrode, for generating a wave at a predetermined frequency, a storage circuit connected between said parallel resonant circuit and a point of fixed reference potential in said network, means for impressing a reference wave between said emitter electrode and said point of fixed reference potential for effecting current flow in said storage circuit and providing resultant corrective control voltage proportional to the phase difference between said reference wave and said generated wave, means for applying said corrective voltage to said base electrode for varying said reactive impedance characteristic and to adjust the phase of said generated wave to be cophasal with said reference wave, and an output circuit for the generated and controlled wave coupled with said parallel resonant circuit.

3. A controlled oscillator circuit comprising in combination, a semi-conductor device including a base electrode, an emitter electrode and a collector electrode, and having a reactive characteristic proportional to the current through said device, means connected with said electrodes including a parallel resonant tank circuit for establishing an oscillatory circuit to generate a wave of a predetermined frequency, means coupled with one of said electrodes for impressing a reference wave thereon, means including said semi-conductor device for detecting the phase difference between said generated wave and said reference wave and providing a current in said base electrode in sense and magnitude in accordance with said detected phase difference to vary said reactive characteristic of said semi-conductor device and alter the frequency of oscillation of said oscillator circuit in accordance with said reactive change to lock said oscillator circuit in phase with said reference wave.

4. A controlled oscillator circuit comprising in combination, a semi-conductor device including a base electrode, an emitter electrode and a collector electrode, and having a reactive characteristic proportional to the current through said device, means connected with said electrodes including a parallel resonant tank circuit connected with said base electrode for establishing an oscillatory circuit to generate a wave of a predetermined frequency, means coupled with said emitter electrode for impressing a reference wave thereon, means including said semi-conductor device for detecting the phase difference between said generated wave and said reference wave and providing a corrective voltage in accordance with said detected phase difference, feedback means connected between said base electrode and said collector electrode to vary said reactive characteristic of said semi-conductor device in accordance with said corrective voltage and alter the frequency of oscillation of said oscillator circuit in accordance with said reactive change to lock said oscillator circuit in phase with said reference wave.

5. A controlled oscillator circuit comprising in combination, a semi-conductor device including a semi-conductive body and having a base electrode, an emitter electrode and a collector electrode in contact with said body, direct current bias means coupled with said collector electrode for establishing a reverse bias between said collector electrode and said base electrode, a parallel resonant tuned circuit including a variable capacitor and a tapped inductor, said parallel resonant tuned circuit being coupled between said base electrode and said emitter electrode, a pair of resistors connected in series between said base electrode and a point of fixed reference potential, the tap on said inductor being connected to the junction of said pair of resistors, a capacitor connected in parallel with one of said pair of resistors, an input circuit for impressing a reference wave on said collector electrode circuit, and a signal output circuit coupled to said base electrode.

6. A controlled oscillator circuit comprising in combination, a semi-conductor device including a semi-conductive body and having a base electrode, an emitter electrode and a collector electrode in contact with said body, a first source of direct current bias voltage coupled with said collector electrode, for establishing a reverse bias between said collector electrode and said base electrode, a parallel resonant tuned circuit including a variable capacitor and a tapped inductor, said parallel resonant tuned circuit being coupled between said base electrode and said emitter electrode, a second source of direct current bias voltage, a bias resistor connected between said base electrode and said second source of bias voltage for providing a forward bias between said base electrode and said emitter electrode, a storage circuit connected to said collector electrode for developing a corrective voltage, a feedback resistor connected between said collector electrode and said base electrode, an input circuit for impressing a reference wave on said collector electrode circuit, and a signal output circuit coupled to said base electrode.

7. A controlled oscillator circuit comprising in combination, a semi-conductor device including a semi-conductive body and having a base electrode, an emitter electrode and a collector electrode in contact therewith and having a reactive characteristic which is proportional to the current through said device, a parallel resonant circuit coupled with said base electrode to provide an oscillatory circuit, an input circuit for impressing a reference wave on said oscillatory circuit connected in series between said parallel resonant circuit and said emitter electrode, direct current bias means for providing a reverse bias between said collector electrode and said base electrode and including a resistor connected to said collector electrode, a capacitor connected in shunt with said resistor, a feedback element connected between said collector electrode and said base electrode, and direct current bias means for impressing a reverse bias between said base electrode and said collector electrode and for providing a forward bias between said base electrode and said emitter electrode.

8. A controlled oscillator circuit comprising in combination, an amplifier device including a base electrode, an emitter electrode and a further electrode, a parallel resonant oscillatory circuit coupled with said electrodes for providing a generated signal wave, an input circuit for impressing a reference signal wave on said oscillatory circuit connected in series between said resonant circuit and said emitter electrode, means providing a direct-current operating voltage for said device including a voltage drop producing resistor connected to said further electrode, a storage capacitor connected in shunt with said resistor, a feedback element connected between said further electrode and said base electrode, and an output circuit for said generated wave coupled with said tank circuit.

9. A controlled oscillator circuit comprising in combination, an amplifier device including a control electrode, a common electrode and an anode, and having a reactive characteristic proportional to the voltage applied to said control electrode, a parallel resonant oscillatory circuit coupled with said electrodes for providing a generated signal wave, an input circuit connected in series between said resonant circuit and said common electrode for impressing a reference signal wave on said oscillatory circuit, means for providing direct current energizing voltages for said amplifier device and including a load resistor connected to said anode, a storage capacitor connected in shunt with said resistor, said load resistor and said storage capacitor providing a storage circuit, a feedback element connected between said anode and said control electrode, and an output circuit for said generated signal wave coupled with said resonant circuit.

10. In a color television system in which a received composite signal includes a burst of several cycles of color subcarrier waves following each horizontal synchronization signal; an automatic frequency control system comprising, a normally non-conducting burst separator circuit; means for impressing said composite signal upon said burst separator circuit; means responsive to said horizontal synchronizing signals and impressing keying pulses upon said burst separator circuit to render said burst separator circuit conducting during the reception period of said subcarrier wave frequency burst; a controlled oscillator circuit including an amplifier device having a control electrode, a common electrode and a further electrode, and means connected with said device for generating a wave having a predetermined frequency, means for impressing the output wave of said burst separator circuit between the control electrode and one of the other electrodes of said amplifier device; means including said amplifier device for detecting the phase difference between said generated wave and the output wave of said burst separator circuit and developing a corrective voltage proportional thereto; means for impressing said corrective voltage on said control electrode to maintain the frequency of said oscillator synchronous and cophasal with said received subcarrier wave frequency burst, and an output circuit for said generated wave coupled with said control electrode.

11. In a color television system in which a received composite signal includes a burst of several cycles of color subcarrier waves following each horizontal synchronization signal; an automatic frequency control system comprising; a normally non-conducting burst separator circuit; means for impressing said composite signal upon said burst separator circuit; means responsive to said horizontal synchronizing signals and impressing keying pulses upon said burst separator circuit to render said burst separator circuit conducting during the reception period of said subcarrier wave frequency burst; a controlled oscillator circuit including an amplifier device having a control electrode, a common electrode and a further electrode for generating a wave having a predetermined frequency; means for impressing the output wave of said burst separator circuit between said control electrode and said common electrode; means including said amplifier device for detecting the phase difference between said generated wave and the output wave of said burst separator circuit and providing a corrective voltage proportional to said phase difference; a feedback circuit for impressing said corrective voltage on said control electrode, whereby said oscillator circuit is locked in phase with said burst; and an output circuit for said generated wave coupled with said oscillator circuit.

12. In a color television system in which a received composite signal includes a burst of several cycles of color subcarrier waves following each horizontal synchronization signal; an automatic frequency control system comprising; a normally non-conducting burst separator circuit; means for impressing said composite signal upon said burst separator circuit; means responsive to said horizontal synchronizing signals and impressing keying pulses upon said burst separator circuit to render said burst separator circuit conducting during the reception period of said subcarrier wave frequency burst; a controlled oscillator circuit including a semi-conductor device having a base electrode, an emitter electrode and a collector electrode, means for impressing the output wave of said burst separator circuit on said collector electrode; means including said semi-conductor device for detecting the phase difference between said generated wave and the output wave of said burst separator circuit; means for impressing a bias on said base electrode, said bias being proportional to the phase difference between said waves, whereby said oscillator circuit is locked in phase with said burst; and an output circuit for said generated wave coupled with said control electrode.

13. In a color television receiver, a frequency controlled oscillator circuit comprising a single amplifier device including connections in said circuit to simultaneously (1) develop a reference frequency oscillator signal, (2) compare said oscillator signal with a burst signal to develop a difference voltage, and (3) provide frequency control of said oscillator signal in response to said difference voltage in accordance with the frequency of said burst signal, said circuit connections including only passive circuit elements and comprising: feedback means connected with said device to generate a reference frequency oscillator signal of predetermined frequency, means connected to apply a burst signal to said device for comparison with said oscillator signal to provide current flow through said device representative of the phase difference between said oscillator signal and said burst signal, means for developing a voltage in response to said current flow representative of the phase difference between said oscillator signal and said burst signal, and feedback means for applying said voltage to said device to vary the capacitive reactance of said device and to control the frequency of said oscillator signal in accordance with the frequency of said burst signal.

14. In a color television receiver, a frequency controlled oscillator circuit comprising a single transistor having at least three electrodes and including connections in said circuit to simultaneously (1) generate an oscillator signal, (2) compare said oscillator signal with a received burst signal to develop a difference voltage, and (3) provide frequency control of said oscillator signal in accordance with the frequency of said burst signal, said circuit connections including only passive circuit elements and comprising: feedback means connected with said transistor to generate a reference frequency oscillator signal of predetermined frequency, means connected to apply a burst signal between two electrodes of said transistor for comparison with said oscillator signal to provide current flow through said transistor representative of the phase difference between said oscillator signal and said burst signal, means for developing a voltage in response to said current flow representative of the phase difference between said oscillator signal and said burst signal, and feedback means for applying said voltage to said transistor to vary the input capacitance thereof and to control the ferquency of said oscillator signal in accordance with the frequency of said burst signal.

References Cited in the file of this patent

UNITED STATES PATENTS

| | | |
|---|---|---|
| 2,341,040 | Hathaway | Feb. 8, 1944 |
| 2,378,746 | Beers | June 19, 1945 |
| 2,538,261 | Moore | June 16, 1951 |
| 2,593,005 | Bridges | Apr. 15, 1952 |
| 2,801,282 | Sonnenfeldt | July 30, 1957 |

OTHER REFERENCES

"Junction Transistor Equivalent Circuits and Vacuum-Tube Analogy," by Giacoletto, pages 1490–1493, Proc. IRE, vol. 40, No. 11, November 1952.